July 2, 1946.  L. S. KASSEL  2,403,375
PROCESS FOR EFFECTING CATALYZED REACTIONS
Filed Jan. 30, 1939
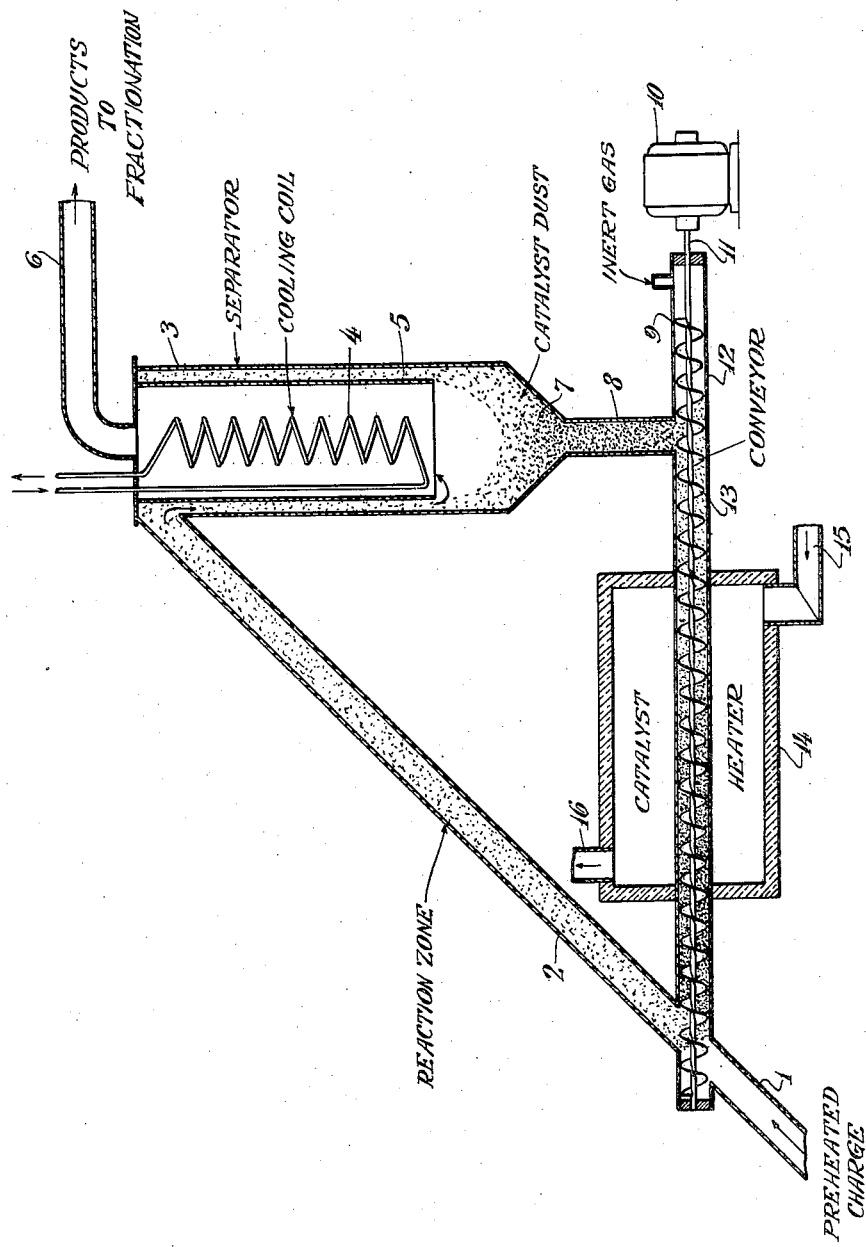
Inventor:
Louis S. Kassel
By Lee J. Gary
Attorney Patented July 2, 1946

2,403,375

UNITED STATES PATENT OFFICE 2,403,375

PROCESS FOR EFFECTING CATALYZED REACTIONS

Louis S. Kassel, Chicago, Ill., assignor to Universal Oil Products Company, Chicago, Ill., a corporation of Delaware Application January 30, 1939, Serial No. 253,484

24 Claims. (Cl. 196—52)

This invention relates to processes for effecting catalyzed reactions and particularly those occurring under substantially vapor phase conditions.

It is more specifically concerned with a method of catalyzing vapor phase reactions among organic compounds and particularly hydrocarbons which involves a considerable departure from the methods ordinarily employed in that instead of passing the vapors of reactants through stationary beds of granular catalytic materials, the vapors are caused to carry more finely divided powdered catalysts so that considerably more catalytic surface is exposed and the effectiveness of the catalyst is greatly increased. While the principles of the invention to be presently disclosed are more particularly applicable to catalyzing vapor phase reactions, they may be applied with suitable and more or less obvious modifications to mixed phase reactions or liquid phase reactions.

The invention further embodies novel ideas in the matter of accurate control of the temperatures of catalyzed reaction zones without direct heat exchange between said reaction zone and its surroundings. This is accomplished by using the catalyst as a heat carrier or temporary heat reservoir, so that heat flows from catalyst to reactants to maintain the temperature of an endothermic reaction.

The present process although applicable to any catalyzed vapor phase reaction is more particularly directed to catalyzed reactions among hydrocarbons such as the gaseous and liquid fractions of petroleum and also individual hydrocarbon compounds which are in general vaporizable under ordinary temperatures and pressures without material decomposition. Such reactions may include cracking relatively heavy fractions of petroleum to produce substantial yields of gasoline therefrom, reforming straight run or cracked gasolines of relatively low knock rating to improve them in this respect, hydrogenation reactions such as destructive hydrogenation, dehydrogenation reactions in which hydrogen is, for example, split off from a paraffin to produce the corresponding mono-olefin, and dehydrocyclization reactions in which further reactions from monomolecular dehydrogenation occur involving removal of more hydrogen and the cyclization of unsaturated chain compounds to form ring compounds of a partially saturated or a completely aromatic character. Other types of catalyzed dehydrogenation reactions which can be brought about in accordance with the present process include the dehydrogenation of naphthenic hydrocarbons and the dehydrogenation and cyclicizing of olefinic or acetylenic hydrocarbons. All these types of reactions are of primary importance in the present stage of the development of the petroleum industry which depends upon them for the more complete utilization of an important natural resource.

The types of reactions mentioned as those to which the present process can be applied may use a variety of catalysts. For example, in cracking, any catalysts may be used which are suitable in regard to size and specific gravity of the particles to enable them to be carried around in the cycle. Such catalysts may include, for example, various refractory materials including silicates, both natural and artificial; clays, raw or acid treated; fuller's earth; kieselguhr; and metallized refractory supports such as, for example, some form of silica such as kieselguhr supporting reduced nickel or other metals of similar catalytic activity. Among dehydrogenation catalysts which have proved of value are metals of the iron group including iron, nickel, and cobalt, the platinum group including platinum, and palladium, and in the case of hydrocarbons, the compounds and preferably the oxides of the elements in the left-hand column of the 4th, 5th and 6th groups of the periodic table which are preferably used on relatively inert supports of the character mentioned in the case of the cracking catalysts. These catalysts are also effective in producing cyclic compounds from aliphatic compounds under increased severity of operating conditions. Recognized hydrogenation catalysts include metals of the iron group and the oxides of chromium, molybdenum, and tungsten.

In the practical use of granular catalysts, there are limitations to the smallness of catalyst particles which may be employed in any given reaction since the carbonaceous materials formed and deposited as a result of undesirable side reactions are frequently of a gummy or sticky character and in the case of extremely fine granules, a bed of catalyst tends to cohere and greatly increase the resistance to flow of vapors therethrough to a point even higher than that primarily experienced with the finely divided catalyst. Thus two factors operate, one in the direction of utilization of finely divided catalyst to attain maximum contact for a given weight and the other to limit the size of particles to reduce pressure drop through the catalyst beds and eliminate tendency of particles to stick together and cause channeling and increased resistance to flow. In the present process, not only are many of the undesirable features inherent in the use of stationary beds of granular catalyst substantially eliminated, but further difficulties involving the addition of heat to maintain the proper reaction temperature are overcome to a large extent.

In one specific embodiment the present invention comprises a process for catalyzing reactions occurring among organic compounds and particularly among hydrocarbons which comprises preheating reactants to reaction temperature, preheating powdered catalyst for the reaction to a temperature above that of the reactants to be endothermically converted and to an extent sufficient to maintain the desired reaction temperature, injecting the preheated powdered catalyst into the stream of reactants, maintaining contact between the reactant and the catalyst for a time sufficient for the completion of the desired reactions, separating catalyst and products, and recycling the separated catalyst to further use.

It will be seen from the foregoing general statement as to the type of process involved in the present invention that it has a wide applicability and that many types of apparatus can be employed in commercial practice. The particular design of such apparatus will depend upon many factors including the type of reaction, the catalyst used, the temperature, pressure, and time of contact, which are found optimum for accomplishing best results, the amount of carbonaceous materials formed in the course of the reaction, and various problems involving corrosion and the use of different types of metals. However, for illustrating in a general way, one type of apparatus which may be utilized to perform the steps of the process, the attached drawing has been provided which shows diagrammatically and without regard to any absolute or relative scale an arrangement of apparatus in which characterstic operations may be brought about.

Referring to the drawing, line 1 is shown as an inlet line for vapors or liquids which are to be reacted in the presence of catalysts such as, for example, preheated vapors of hydrocarbons which are to be cracked. As the vapors or liquid pass through the tube they receive powdered catalyst at a regulated rate from line 12 containing a screw conveyor 13. By adjusting the rates of flow of reactants and catalyst and proportioning the amount of catalyst added reactions are instigated leading to the formation of desired products. After passing through reaction zone 2, the products enter a separator 3 which may be of any suitable type such as a cyclone separator which produces a swirling motion promoting centrifugal separation of particles or it may be in some instances of the electrical precipitator type. In order to reduce the temperature of the products to a point below the reaction temperature a cooling coil 4 is shown which is provided to quench the products and stop the reactions at any desired point. A cylinder 5 integral with the top of the separator and open at the bottom indicates a baffle for directing the inlet materials downwardly and increasing the efficiency of the separation so that no catalyst particles are carried upwardly with the products of the reaction which are withdrawn to fractionation or other service through line 6. Catalyst dust indicated at 7 after settling in the bottom of the separator passes through line 8 into return line 12 from which it is sent back to the reaction zone as already mentioned. Line 12 may contain a conveying screw 13 mounted on a shaft 11 actuated by a motor 10. In order to prevent carbonization of the deposits on the catalyst particles during their return to the reaction zone, an additional conveying effect may be had by admitting some inert gas through line 9 in a steady stream. 14 indicates a heater for bringing the powdered catalyst back to an optimum temperature and such a heater may have inlet line 17 and exit line 16 for the admission and evacuation of heating fluids.

The above description of the method of operation of the process is given in very simple outline with the object of making clear the basic features of the invention without complicating the issue by the introduction of a mass of operating details which are readily taken care of by those conversant with these types of operation. It will be seen from the foregoing description that the invention refers to the cyclic use of powdered catalyst in organic and particularly hydrocarbon reactions wherein the powdered catalyst itself is utilized to maintain a desired average reaction temperature.

The proportions of dust and gas are such that the heat capacity of the dust is substantial in comparison with that of the gas. The dust is preheated, or, if necessary, precooled when its temperature is too high as a result of regeneration, to substantially the desired reaction temperature, the gas is separately brought to substantially the desired reaction temperature, and the two are then commingled in the desired proportions by means of an injector, a screw feed, or any other suitable device. The reaction vessel may consist, for example, of a coil or bank of pipes in series connection or of a single large vessel. The large heat capacity of the dust acts as a heat reservoir, so that the heat of reaction does not appreciably affect the temperature. Heat transfer through the walls of the reaction vessel is therefore not required. The fact permits the use of large diameter pipes or vessels. The mixture of gas and catalyst leaving the reaction vessel is separated by use of an electrostatic precipitator, a cyclone, or other suitable means. The catalyst is recycled, suitable arrangements being made to conserve its heat content. The exit gases are subjected to whatever other processing is desired.

As an example of the operation of the process the following is given without any intent of limiting its proper scope as previously described.

A plant for the catalytic dehydrogenation of butane using an alumina-chromia catalyst was operated at a temperature of approximately 575° C. at a space velocity of 2000 volumes of gas at 60° F. and atmospheric pressure per volume of reaction space per hour and a conversion per pass of 33.3%. The reaction zone comprised a vessel approximately 6 ft. in diameter by 30 ft. long so that the linear gas velocity was about 3000 ft. per minute and the pressure drop was about ½ inch of water. By way of comparison with the present process, it was found that with the use of a stationary bed of catalyst, the size was limited by pressure and temperature drop to a tube about 10 ft. long and 2⅝ inches in diameter and the proportion showed that 2000 such tubes in continuous operation must be operated to give the desired capacity. Furthermore since some of such tubes must undergo regeneration, from 3000 to 6000 would be needed, and much difficulty was encountered in plant and furnace design.

In the operation according to the present process the dust content of the gas was maintained at 0.67 lb. per cu. ft. of vapors involving a circulation of 50,000 lbs. per minute and a total heat capacity of about 15,000 B. t. u. per degree per minute. The heat capacity of the butane was about 2,000 B. t. u. per degree per minute and the total required heat of reaction was indicated by a 70° drop in temperature.

I claim as my invention:

1. A process for dehydrogenating aliphatic hydrocarbons to produce unsaturated derivatives therefrom which comprises preheating said hydrocarbons to a reaction temperature, introducing to the thus heated hydrocarbons a dehydrogenating catalyst preheated to a temperature substantially above the desired reaction temperature and in an amount sufficient to supply substantially all of the endothermic heat of the dehydrogenating reaction, maintaining the hydrocarbons and catalyst in contact for a regulated time at the desired reaction temperature in a reaction zone, separating the catalyst from the reaction products, readjusting the temperature of the catalyst to approximately the second-mentioned temperature, and returning it to the reaction zone.

2. A process for cracking hydrocarbons to produce lower boiling hydrocarbons therefrom which comprises preheating the first-named hydrocarbons to a cracking temperature, introducing to the thus heated hydrocarbons a cracking catalyst preheated to at least said cracking temperature and in an amount sufficient to supply substantially all of the endothermic heat of the cracking reaction, maintaining the hydrocarbons and catalyst in contact for a regulated time at cracking temperature in a reaction zone, separating the catalyst from the reaction products, reheating the catalyst to at least said cracking temperature, and returning it to the reaction zone.

3. A process for cracking hydrocarbon oils to produce substantial yields of gasoline and readily polymerizable olefins therefrom which comprises vaporizing said oil, preheating the vapors to a cracking temperature, commingling with the vapors finely divided cracking catalyst preheated to a temperature substantially above the cracking temperature and in an amount sufficient to supply substantially all of the endothermic heat of the cracking reaction, passing the vapors and catalyst in admixture through a reaction zone maintained at cracking temperature and therein effecting substantial cracking of the vapors, separating the catalyst from the reaction products, readjusting the temperature of the catalyst to approximately the second-mentioned temperature, and returning it to the reaction zone, and fractionating the cracked products for the recovery of said gasoline and polymerizable olefins.

4. In a process of the character wherein a vaporous reactant is endothermically reacted while passing through a reaction zone in admixture with a powdered catalyst, the improvement which comprises preheating powdered catalyst to at least the reaction temperature of the reactant and imparting thereto sufficient heat to maintain said reaction temperature in the reaction zone, commingling with and dispersing in the vaporous reactant such an amount of thus preheated catalyst as will supply substantially all of the heat required for the endothermic reaction, passing the resultant catalyst-reactant dispersion through and maintaining the same in said zone for a sufficient time to effect the endothermic reaction of the reactant and thereafter separating the resultant reaction products from the catalyst.

5. In a process of the character wherein a vaporous reactant is endothermically reacted while passing through a reaction zone in admixture with a powdered catalyst, the improvement which comprises preheating powdered catalyst to at least the reaction temperature of the reactant and imparting thereto sufficient heat to maintain said reaction temperature in the reaction zone, commingling with and dispersing in the vaporous reactant such an amount of thus preheated catalyst as will supply substantially all of the heat required for the endothermic reaction, passing the resultant catalyst-reactant dispersion through and maintaining the same in said zone for a sufficient time to effect the endothermic reaction of the reactant and thereafter separating the resultant reaction products from the catalyst, reheating the separated catalyst to at least said reaction temperature and commingling it with additional quantities of the reactant as aforesaid.

6. The improvement as defined in claim 4 further characterized in that the powdered catalyst is preheated to a temperature above said reaction temperature.

7. The improvement as defined in claim 4 further characterized in that the powdered catalyst is preheated to approximately said reaction temperature.

8. The improvement as defined in claim 4 further characterized in that the reactant is preheated to approximately said reaction temperature prior to the commingling of the catalyst therewith.

9. A process for the catalytic cracking of hydrocarbons which comprises commingling preheated powdered cracking catalyst with a moving stream of hydrocarbon vapors and dispersing the catalyst powder in said stream, the temperature and amount of the catalyst being such that the catalyst will supply substantially all of the heat required for the cracking of the hydrocarbons, passing the resultant catalyst-vapor dispersion through a reaction zone and therein cracking the hydrocarbons by the heat imparted thereto from the catalyst.

10. The process as defined in claim 9 further characterized in that the hydrocarbons are preheated to cracking temperature prior to the commingling of the catalyst therewith.

11. A process for dehydrogenating hydrocarbons which comprises commingling the hydrocarbons with preheated powdered dehydrogenating catalyst, the temperature and amount of the catalyst being such that the catalyst will supply substantially all of the heat required for the dehydrogenation of the hydrocarbons, and dehydrogenating the hydrocarbons by the heat imparted thereto from the catalyst.

12. The process as defined in claim 11 further characterized in that the hydrocarbons are preheated to dehydrogenating temperature prior to the commingling of the catalyst therewith.

13. A process for the endothermic conversion of hydrocarbons which comprises introducing a stream of hydrocarbon vapors to a reaction zone and passing the same in a generally upward and unobstructed path through said zone, commingling with and dispersing in the vapor stream being introduced to said zone a heated finely divided solid catalyst at a temperature and in an amount sufficient to supply substantially all of the endothermic heat of the conversion reaction, passing the catalyst particles in said generally upward and unobstructed path by the gas-lift action of the hydrocarbon vapors, maintaining the catalyst-vapor dispersion in the reaction zone for a sufficient time to effect substantial endothermic conversion of the hydrocarbons with the aid of the heat of the catalyst, separating entrained catalyst particles from the thus treated hydrocarbon vapors, heating the separated catalyst particles outside the reaction zone and returning the same thereto at a temperature and rate regulated to maintain a substantially constant temperature in the reaction zone.

14. The process as defined in claim 13 further characterized in that said stream of hydrocarbon vapors is preheated to substantially the reaction temperature prior to the commingling of the catalyst therewith.

15. The process as defined in claim 13 further characterized in that the catalyst is heated to and commingled with the stream of vapors at a temperature above the conversion temperature of the hydrocarbons.

16. In a process of the character wherein a hydrocarbon reactant is endothermically reacted while passing through a reaction zone in contact with finely divided solid catalyst, the method which comprises heating finely divided solid catalyst independently of the hydrocarbon reactant to at least the reaction temperature of the reactant and imparting thereto sufficient heat to maintain said reaction temperature in the reaction zone, introducing thus heated catalyst to the reaction zone in an amount sufficient to supply all of the endothermic heat of the reaction, maintaining the catalyst in motion in the reaction zone by the action of the hydrocarbons passing through said zone and retaining the reactant in contact with the catalyst in said zone for a sufficient time to effect the endothermic reaction thereof, and separating the resultant hydrocarbon reaction products from the catalyst.

17. In a process of the character wherein a hydrocarbon reactant is endothermically reacted while passing through a reaction zone in contact with finely divided solid catalyst, the method which comprises heating finely divided solid catalyst independently of the hydrocarbon reactant to a temperature above the reaction temperature of the reactant and imparting thereto sufficient heat to maintain said reaction temperature in the reaction zone, introducing thus heated catalyst to the reaction zone in an amount sufficient to supply substantially all of the endothermic heat of the reaction, maintaining the catalyst in motion in the reaction zone by the action of the hydrocarbons passing through said zone and retaining the reactant in contact with the catalyst in said zone for a sufficient time to effect the endothermic reaction thereof, removing resultant hydrocarbon reaction products and catalyst from the reaction zone, and reheating the withdrawn catalyst to a temperature above said reaction temperature and introducing the same to the reaction zone as aforesaid.

18. A process for the catalytic endothermic conversion of hydrocarbons which comprises introducing preheated powdered catalyst to a moving stream of the hydrocarbons, the temperature and amount of the catalyst being such that the catalyst will supply substantially all of the endothermic heat of the hydrocarbon conversion reaction, passing the hydrocarbons through a reaction zone and maintaining the catalyst in motion in said zone by the action of the hydrocarbons, and endothermically converting the hydrocarbons in the reaction zone by the heat imparted thereto from the catalyst.

19. A process for dehydrogenating and cyclicizing aliphatic hydrocarbons to produce aromatic hydrocarbons therefrom which comprises commingling the aliphatic hydrocarbons with preheated powdered dehydrocyclization catalyst, the temperature and amount of the catalyst being such that the catalyst will supply substantially all of the endothermic heat of the dehydrogenating and cyclicizing reaction, and dehydrogenating and cyclicizing the hydrocarbons by the heat imparted thereto from the catalyst.

20. A process for cracking hydrocarbons which comprises commingling the hydrocarbons with preheated powdered cracking catalyst, the temperature and amount of the catalyst being such that the catalyst will supply substantially all of the endothermic heat of the cracking reaction, and cracking the hydrocarbons by the heat imparted thereto from the catalyst.

21. In the conversion of hydrocarbons by reactions which require the supplying of heat to maintain the conversion in progress, the process which comprises commingling the hydrocarbons with preheated powdered conversion catalyst, the temperature and amount of the catalyst being such that the catalyst will supply substantially all of the heat required for the conversion of the hydrocarbons, and converting the hydrocarbons by the heat imparted thereto from the catalyst.

22. The process as defined in claim 21 further characterized in that the hydrocarbons are preheated prior to commingling the same with the catalyst.

23. In the endothermic conversion of hydrocarbons while passing through a reaction zone in contact with solid conversion catalyst, the process which comprises heating a solid conversion catalyst in subdivided form exteriorly of said zone to at least the conversion temperature of the hydrocarbons, introducing the thus heated subdivided catalyst to the reaction zone in an amount sufficient to supply substantially all of the endothermic heat of the hydrocarbon conversion reaction, passing the catalyst through the reaction zone and maintaining the hydrocarbons in contact therewith for a sufficient time to effect the endothermic conversion thereof.

24. In the cracking of hydrocarbons while passing through a conversion zone in contact with solid cracking catalyst, the process which comprises heating a solid cracking catalyst in subdivided form exteriorly of said zone to at least the cracking temperature of the hydrocarbons, introducing the thus heated subdivided catalyst to the conversion zone in an amount sufficient to supply substantially all of the endothermic heat of the cracking reaction, passing the catalyst through the conversion zone and maintaining the hydrocarbons in contact therewith for a sufficient time to effect the cracking thereof.

LOUIS S. KASSEL.